(No Model.)
R. R. EARNEST.
THILL COUPLING.
No. 300,057. Patented June 10, 1884.
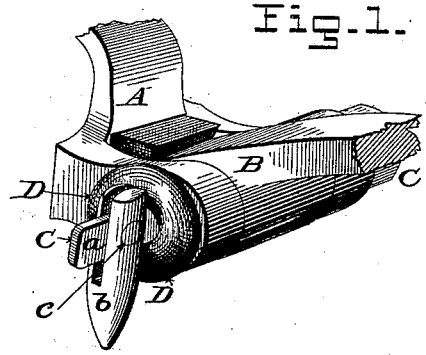
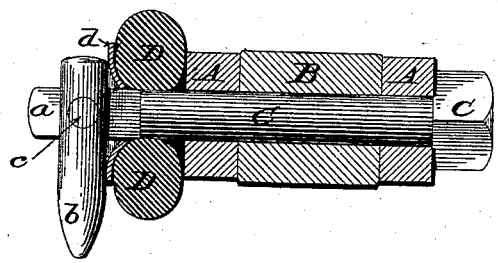
WITNESSES:
Jas. F. Duhamel.
Walter S. Dodge.
INVENTOR:
Robert R. Earnest,
by Dodgeson,
Attys.

UNITED STATES PATENT OFFICE.

ROBERT R. EARNEST, OF MECHANICSBURG, OHIO, ASSIGNOR OF ONE-HALF TO THOMAS M. BATES, OF SAME PLACE.

THILL-COUPLING.

SPECIFICATION forming part of Letters Patent No. 300,057, dated June 10, 1884.

Application filed March 6, 1884. (No model.)

*To all whom it may concern:*

Be it known that I, ROBERT R. EARNEST, of Mechanicsburg, in the county of Champaign and State of Ohio, have invented certain Improvements in Thill-Couplings, of which the following is a specification.

My invention relates to thill-couplings; and it consists in the combination, with the clip and thill-iron, of a pin or bolt having a pointed end section jointed to the body or shank of the bolt, adapted to readily enter and pass through the eyes of the clip and thill iron and through a rubber washer or button at the side of the clip, and to turn down at right angles to the shank to prevent accidental removal or displacement.

In the drawings, Figure 1 is a perspective view of my improved coupling, and Fig. 2 a view showing the clip and thill or shaft iron in section.

The purpose of my invention is to provide a safe fastening for thills which may be readily applied and removed, which shall be cheap and durable in construction, and noiseless in use. To this end I combine with the ordinary clip-iron, A, and thill B a bolt or pin, C, to pass through the eyes of said parts in place of the ordinary threaded bolt, and I construct this pin or bolt in the manner shown in the drawings. As there represented, the pin or bolt C is made in two parts or sections, *a* and *b*, the part *a* being headed at one end, flattened and reduced at the opposite end, and the part *b* being slotted to straddle or clasp the flattened end of part *a*, and the two being united or jointed by a pin or pivot, C, as shown. The outer extremity of the part *b*, which in use hangs down by reason of its greater weight than the inner end, and thereby acts as a latch to retain the pin in place, is pointed, as shown, so that when the latch *b* is raised up into line with part *a* the pointed end may be passed through the eyes of the clip and thill iron quickly and with certainty, which cannot be done with a blunt-ended pin, such as has before been proposed. The pivot C is located at such point that when the pin or bolt is placed in position to connect the thill-iron and clip a sufficient space shall be left between the side of the clip-iron and the inner end of the latch *b* to permit the application of an elastic washer, D, which is made of rubber. The washer is preferably of cylindrical form in cross-section or cut away around the hole to prevent the latch from cutting or tearing the rubber.

I am aware that a device similar in its general principles to mine has been patented; but in said patented device a blunt-ended latch and a spiral spring of wire were used instead of my pointed latch and elastic washer. The difference is important, because the latch insures ready insertion and avoids the difficulty experienced in applying the blunt-ended latch, and because a wire spring wears rapidly, produces noise, and is far more liable to lose its shape and become inoperative in this connection. Another and a very important advantage is that it avoids the necessity of special tools to force back the thill-iron against the spring or "anti-rattler" used in nearly all modern thill-couplings.

To prevent the inner end of the latch *b* from cutting the rubber washer, the latter may be faced with a thin disk, *d*, of metal, on the outer side, as shown in Fig. 2, the disk being secured by cement or otherwise; or a separate metal washer may be used. When the pin or bolt is inserted, the washer or button applied, and the latch turned down, the elasticity of the compressed washer causes its face to press against the latch above and below its pivot, and thus to hold it at right angles to the body of the pin or bolt; hence the accidental displacement of the bolt is prevented, and all rattling of the bolt is obviated.

When it is desired to detach the thills, it is only necessary to swing up the latch into line with the body of the bolt or pin, the rounded inner end of the latch in such case compressing and forcing back the rubber washer without any other manipulation, which cannot be done where a spiral spring is used, as in the prior device mentioned, because the wire of the spring will be caught between the body of the bolt and the inner end of the latch when the latch is raised, unless the spring be first independently pressed back.

The rubber washer D is made with a small opening to cause it to hug the bolt closely, so that even if the latch should be accidentally brought into line with the body of the bolt the washer would still hold the bolt in place, unless considerable longitudinal pressure were put upon the bolt. The pointing of the latch is also important, and, in fact, essential to enable it to enter and pass through this small opening.

My improvements are designed to render valuable a device which has not come into use, so far as I am aware, presumably because of objections which my construction completely obviates.

It is of course understood that a coupling such as described is applied to each thill or shaft, as in the case of any other coupling.

I do not claim, broadly, a fastening-bolt having a pivoted latch, or a pointed bolt or pin, they being old devices.

Having thus described my invention, what I claim is—

1. The herein-described thill-coupling, consisting of clip A, thill-iron B, bolt C, having pointed latch $b$ pivoted to its body $a$, and rubber washer D, encircling bolt C and interposed between latch $b$ and the side of the thill-clip, substantially as shown.

2. In combination with a thill-clip and a shaft-iron, a connecting pin or bolt passing through said parts, and provided with a pivoted latch at one end, and a rubber washer encircling the pin between the latch and the clip, and provided with a metal facing to receive the wear of the latch, as described and shown.

ROBERT R. EARNEST.

Witnesses:
OSCAR S. CHENEY,
THEODRICK S. CHENEY.